Oct. 15, 1929.                C. B. BACKER                1,731,882
                            ELECTRIC PERCOLATOR
                          Filed June 16, 1926         2 Sheets-Sheet 2
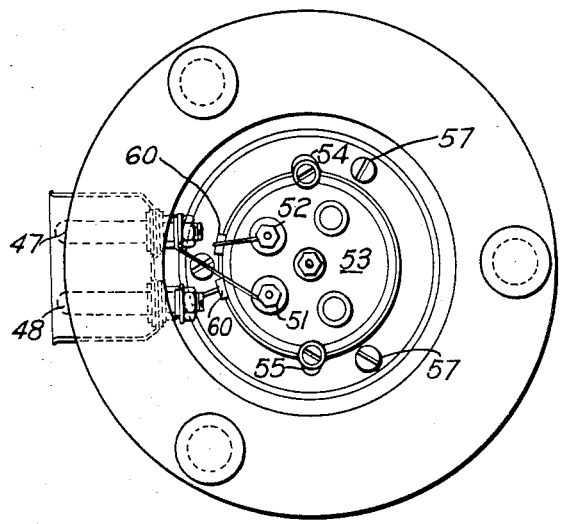
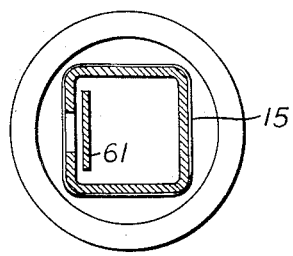
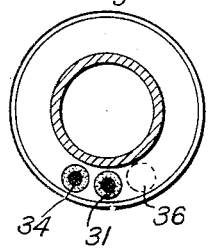
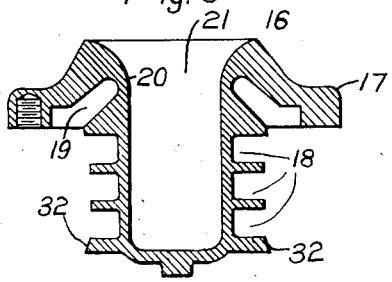
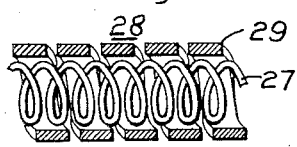
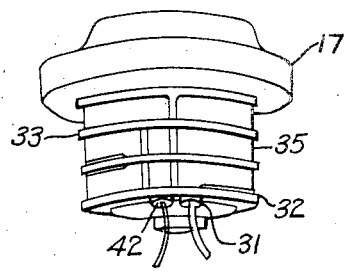
INVENTOR
Christian B. Backer.
BY
Wesley G. Carr
ATTORNEY
WITNESSES:

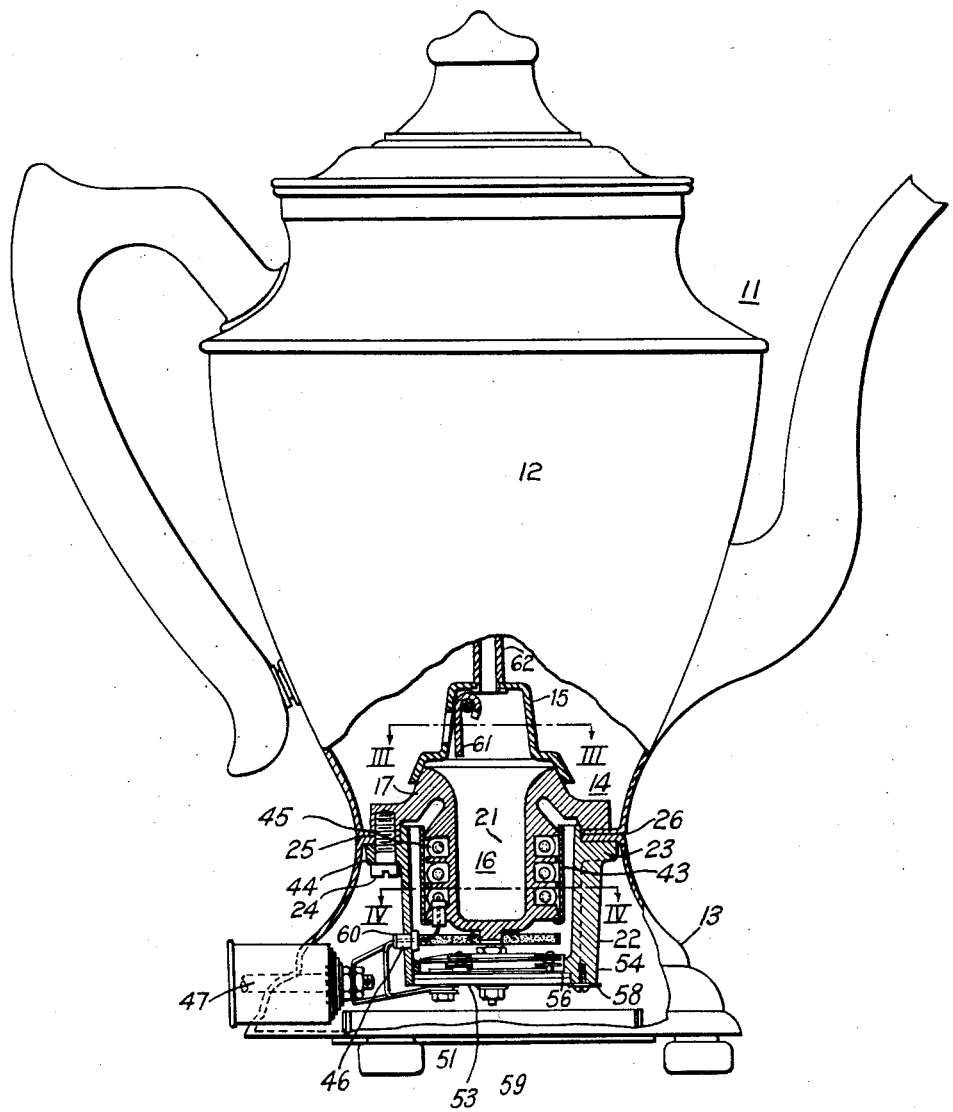

Patented Oct. 15, 1929

1,731,882

UNITED STATES PATENT OFFICE

CHRISTIAN B. BACKER, OF BROOKLYN, NEW YORK

ELECTRIC PERCOLATOR

Application filed June 16, 1926. Serial No. 116,270.

My invention relates to electrically heated devices and particularly to thermostatically controlled electric percolators.

An object of my invention is to provide an electric percolator in which the temperature of the fluid shall not attain the boiling temperature.

Another object of my invention is to provide an electric percolator having a thermally actuable switch that is responsive to the temperature of the percolated fluid and operable to de-energize the heating unit when the fluid attains a predetermined temperature below the boiling point of the fluid.

Another object of my invention is to provide a heating unit for an electric percolator and having a low thermal capacity and that will permit of a rapid heat transfer to the fluid within the vaporizing chamber.

Another object of my invention is to provide a thermally actuable switch for an electric percolator that is responsive to the temperature of the vaporizing chamber when said chamber is empty of fluid.

Another object of my invention is to provide a compact and highly efficient electric heating unit for the vaporizing unit of an electric percolator.

In practicing my invention, I provide a fluid container having a hollow supporting base and a cylindrical depending heating member extending downwardly through a hole in the container and into the hollow space of the supporting base. The cylindrical heating member is of bell-shape at one end and has a flange integral therewith that is larger at the opening than at the bottom of the container. The heating member is supported by the flange which rests on the base of the fluid container. The depending cylindrical portion of the heating member has annular grooves therearound wherein an electric conductor is embedded and is suitably connected to terminals which are adapted to be connected to a source of electric supply.

I provide also a second cylindrical member that is larger than the depending cylindrical heating member and which also has a flange extending outwardly therefrom and corresponding in size to the size of the first named flange. The bottom of the fluid container is clamped between the two flanges by means of screws whereby a fluid-tight joint is made between the flanges and the base of the fluid container. I provide also a thin sheath, of tubular shape, which is pressed on the outside of the cylindrical heating member, thereby maintaining the electric heating unit, comprising the electric conductor and insulating member, within the grooves.

A thermostatically-actuated switch is provided for regulating the temperature of the fluid within the container and is supported from the second named cylinder at the bottom thereof. A non-conducting member is disposed between the thermostat and the cylindrical heating member whereby a direct flow of heat from the heating member to the thermostat is prevented.

In the drawings,

Figure 1 is a view, partially in front elevation and partially in section, of an electric percolator embodying my invention, Fig. 2 is a bottom view of the device illustrated in Fig. 1, Fig. 3 is a view, in horizontal section, taken on the line III—III of Fig. 1, Fig. 4 is a view in horizontal section taken along the line IV—IV of Fig. 1, Fig. 5 is a view, in vertical section, of the depending cylindrical member illustrated in Fig. 1, Fig. 6 is a perspective view of the cylindrical heating member, and Fig. 7 is a view, in section, of a portion of the heating element.

Referring more particularly to Fig. 1, an electric percolator 11 comprises a fluid container 12, a base 13, an electrically heated vaporizing member 14 and a valve member 15. As the particular construction of the fluid container, the valve member and the base form no part of my invention, it is not considered necessary to describe them in detail.

The member 14 comprises a depending cylindrical member 16 having a closed bottom and an annular flange 17 extending from the upper end thereof and annular grooves 18 in the outer surface of the depending cylindrical member 16. A circular annular groove 19 inclined at an angle to the axis of the member 16, extends around the upper and outer surface of the cylinder, to form a reduced section 20 adjacent to the upper part of the member. The member 16 embodies a vaporizing chamber 21.

A second cylindrical member 22 having a flange 23 extending outwardly from the upper end thereof and a flange extending inwardly from the bottom thereof encloses the depending cylindrical member 16. The second cylindrical member is joined to the flange of the first cylindrical member by a plurality of screw bolts 24. The bottom 25 of the container 12 and the top of the base 13 are clamped between the flanges 17 and 23, thereby forming a fluid tight joint 26.

The heating unit comprises a helically wound conductor 27 which is inclosed in an open helix 28 of initially metallic magnesium 29. The magnesium helix having the conductor 27 enclosed therein is inserted in a hole 31 of the lowermost extending flange member 32 illustrated in Fig. 6, extends clockwise around the lowermost annular groove 18, is projected upwardly through a hole 34 in the next upper flange 32 and extends counter-clockwise around the groove 18, then upwardly through a hole 36 in the uppermost flange 32 extends clockwise around the uppermost groove 18 and then projects downwardly through the holes in the three flanges 32 and projects from the depending cylindrical portion through the lowermost flange 32 through a hole 42.

The depending cylindrical portion, as illustrated in Fig. 6, is then treated with steam according to the method described in Patent No. 1,451,755, whereby the magnesium helix 28 is oxidized and changed from magnesium metal to magnesium oxide. Since it is characteristic of magnesium metal to expand to substantially 200% of its original dimensions when treated according to the method described in the aforesaid patent, the conductor 27 is compressibly held in the grooves 18 in good thermally conductive relation with the cylinder 16.

After the magnesium helix 28 inclosing the conductor 27 has been oxidized in its operative relation within the grooves illustrated in Fig. 6, a thin coating of pulverulent material, such as alundum, is placed in the grooves in the form of a cement and then a tube 43 is pressed over the depending cylindrical member 16, thereby preventing the magnesium oxide from falling out of the grooves while in operation.

The second cylindrical member 22 is larger than the depending cylindrical member 16 and has an annular flange 23 extending outwardly from the upper end thereof. Holes 44 are provided in the flange 23 to correspond with the tapped holes 45 in the annular flange 17 of the depending cylindrical member 16. The second cylindrical member 22 is then inserted in the hollow portion of the base 13 and joined with the flange 17 by screw bolts 24, as hereinbefore described. Two holes 46 are provided in the lower portion of the cylindrical member 22 so that the ends of the conductor 27 may be brought out and connected respectively to terminals 47 and 48, to terminals 51 and 52 of a thermostatic switch 53 in series circuit relation.

A flange 56 extends inwardly from the bottom end of the cylindrical member 22. Laterally extending lugs 54 and 55 are provided along the side of the cylindrical member 22 whereby the thermostat 53 may be held against the inwardly extending flange 56 in operative relation to the heating unit 14 by screws 57. The thermostat 53, which I propose to use, is described in Spencer Patent No. 1,561,437.

A thermally non-conductive member 58 is centrally located about a lug 59 at the end of the depending cylindrical member 16 to prevent direct heat flow from the member 16 to the thermostat 53.

The ends of the electric conductor 27 are insulated from the cylindrical member 22 by refractory electrically nonconducting bushings 60.

The following is a description of the operation of the device embodying my invention: The fluid container 12 is filled with a liquid such as water in desirable quantity. When the water level is above the valve 15, water will flow through a closure member 61 of the valve until the fluid level within the tube 62 is at the same height as the fluid in the container 12 and the vaporizing chamber 21 is also filled. If the heating unit is energized it will cause a transfer of heat very quickly to the fluid or the water within the vaporizing chamber 21 by reason of the thin metal walls 16 and also of the close engagement of the heating unit with the walls of the grooves 18. Steam is generated by the flow of heat, and forces the water upwardly through the tube 62 causing percolating action in a manner well known in the art.

As the successive percolating actions as described, continue, the water or fluid within the container 12 approaches the boiling point. But it is desirable in percolating, not to have the water which trickles over the coffee grounds that are suspended in a container (not shown) at the top of the tube 62, brought to a boiling temperature because the boiling of coffee produces the bitter taste in the coffee fluid. As the temperature of the water within the fluid container 12 increases, heat is conducted downwardly through the cylindrical member 22 to the thermostat 53. The thermostat may be adjusted so that when the temperature of the fluid has reached a value of substantially 200° F., it will operate to interrupt the circuit thereby deenergizing the heating unit 14 to prevent further heating of the fluid in the container 12.

The barrier 58 prevents direct heat flow from the member 14 to the thermostat and the annular grove 19 prevents heat flow therefrom to the extremity of the annular flange 17.

However, should the fluid container be empty and the conductor 27 be energized so as to cause the temperature of the member 14 to reach a dangerously high value, sufficient heat will be conducted through the metal section adjacent to the groove 19 in the annular flange 19 and downwardly through the cylindrical member 22 to the thermostat 53 thereby causing deenergization of the heating unit.

Various changes and modifications may be made in the device embodying my invention without departing from the spirit and scope thereof, and I desire that only such limitations shall be placed thereon as are imposed by the prior art.

I claim as my invention:

1. In a percolator the combination with a fluid container and a depending cylindrical member comprising a vaporizing chamber and having an annular flange extending radially outward from the upper end thereof, of an electric heating unit associated with the lower end of said cylindrical member, and means between said annular flange and resistor heating unit for reducing the flow of heat therebetween.

2. In a heating unit for a fluid container, comprising a depending cylindrical member having a vaporizing chamber, and an electrical conductor disposed around said cylindrical member, a second cylindrical member enclosing the depending cylindrical member and having operative engagement therewith at the upper end only, and thermally-actuable means located below the depending cylindrical member and supported by the second cylindrical member.

3. In a heating unit for a fluid container, comprising a depending cylindrical member having a vaporizing chamber, an electric conductor disposed therearound in thermally-conducted relation therewith, a second cylindrical member enclosing said depending cylindrical member and having operative engagement therewith at the upper end thereof only, thermally-actuable means located below said depending cylindrical member and supported by the second cylindrical member and thermally non-conductive means disposed between said depending cylinder and the thermally-actuable means for restricting the flow of heat thereto from said electric resistor.

4. An electric heating unit for a fluid container, comprising a cylindrical metal member embodying a vaporizing chamber and having annular grooves located in the outer surface only, an electrical resistance conductor located in said grooves, and electric-insulating material expansively oxidized in place surrounding the conductor in said grooves for compressibly holding it in the grooves.

5. An electric heating unit for a fluid container, comprising a cylinder closed at one end and open at the other end for constituting a vaporizing chamber and having a groove in its outer surface only, a resistor in said groove, electric-insulating material expansively oxidized in place surrounding the resistor to tightly hold it in the groove and provide a good heat-conducting path to the vaporizing chamber, pulverulent filling material in said groove outside of the electric-insulating material, and a tubular sheath around the cylinder to hold the filling and electric-insulating material in their proper operative positions.

6. A heating unit for a fluid container, comprising a cylinder depending from the container closed at its lower end and open at its upper end to constitute a vaporizing chamber, having an annular flange at its upper end cooperating with the fluid container to form a fluid-tight joint and having annular grooves in the outside wall only, a resistor in said grooves, and electric-insulating material expansively oxidized in place surrounding the conductor in said grooves and compressibly holding it therein and providing also a good heat-conducting path from the resistor to the cylinder.

In testimony whereof, I have hereunto subscribed my name this 22nd day of May, 1926.

CHRISTIAN B. BACKER.